April 21, 1942. E. B. NORMAN ET AL 2,280,533
FILLER NECK FOR LOCOMOTIVE LUBRICATION SYSTEMS
Filed May 16, 1940
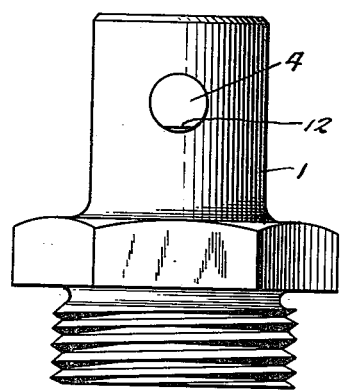
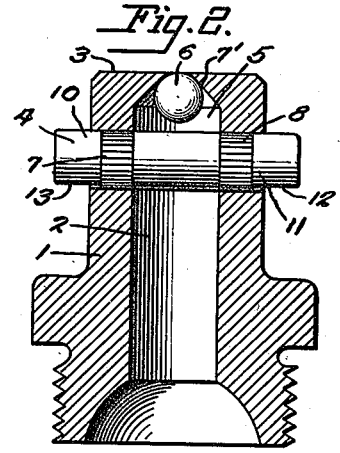
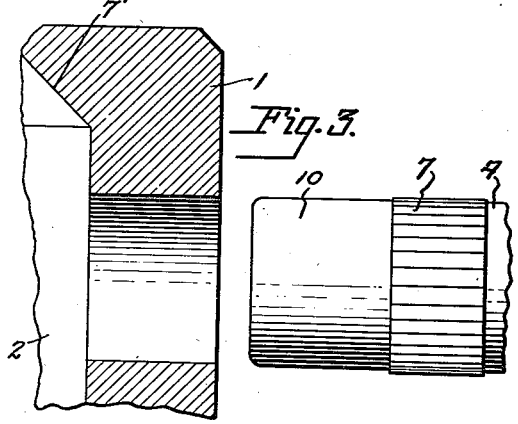
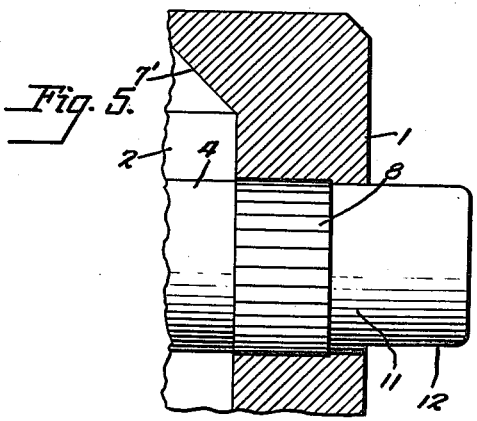
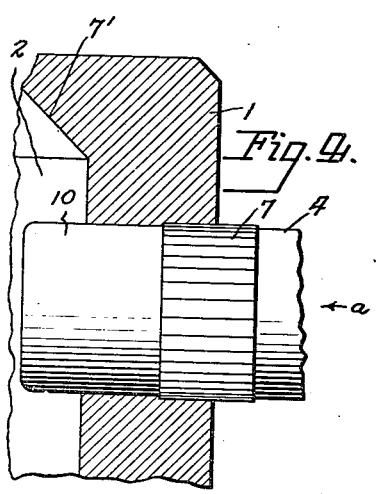
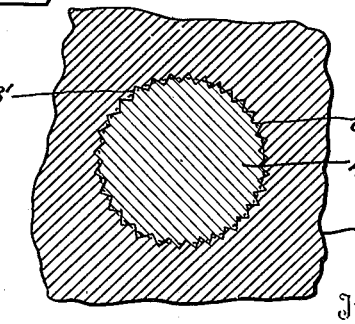
Inventor
E. B. Norman
G. A. Pettit
L. F. Serrick
By Mason Fenwick & Lawrence
Attorneys Patented Apr. 21, 1942

2,280,533

UNITED STATES PATENT OFFICE 2,280,533

FILLER NECK FOR LOCOMOTIVE LUBRICATION SYSTEMS

Ernest B. Norman and George A. Pettit, New Orleans, La., and Leo F. Serrick, Defiance, Ohio; said Pettit and said Serrick assignors to said Norman Application May 16, 1940, Serial No. 335,644

1 Claim. (Cl. 184—105)

The proper lubrication of locomotives and some other heavy duty machinery requires the employment of an unusually heavy or substantially solid lubricant which comes in the form of a stiff candle and must be extruded from the grease gun, first in the form of a filament of small diameter, and finally pressed out in the form of a thin filament between the coacting moving surfaces.

This requires a heavy duty grease gun developing enormous pressure, and which gun is detachably coupled by some form of bayonet slot connection to cross-pins or filler necks, which latter elements are permanently attached at various points on the locomotive structure, and which form the end elements of the lubrication bores which lead to the surfaces to be lubricated.

It will be readily understood by those skilled in the art that the grease gun coupling must make a perfect tight joint with the outer face of the filler neck, otherwise, the grease will be extruded at the joint, and the pressure lost which is relied upon to carry the grease to the ultimate regions to be lubricated.

In order to produce and maintain a leak-tight joint between the grease gun coupling and the filler neck requires that the bayonet slot be tightened against the cross pin with such great force as ordinarily to lead to loosening of the pin, tortional displacement of the pin, and rapid wear of the under side of the pin, so that it soon becomes necessary to replace the filler neck.

The object of the present invention is to provide a filler neck in which these drawbacks are averted, with special reference to an improved pin, and mode of inserting and securing the same in the filler neck, and to means for assuring that the bearing surface of both ends of the pin shall be shaped to minimize wear, and that both shall be precisely in a plane parallel to the plane of the outer end of the filler neck.

With these and other objects in view, the invention is as described and claimed in the following specification and illustrated in the accompanying drawing, in which:

Figure 1 is a side elevation of a filler neck embodying the principles of the present invention;

Figure 2 is an axial cross-section through the filler neck;

Figure 3 is a detailed sectional view illustrating the approach of the pin to the pin-bore in the act of inserting the pin under pressure;

Figure 4 is a view similar to Figure 3, showing the pin in an intermediate stage of insertion;

Figure 5 is a similar view showing one end of the pin in its completely inserted relation to the filler neck;

Figure 6 is a diametrical section through the knurled zone of the pin and the adjacent mass of the wall of the filler neck in which the pin is imbedded.

Referring now in detail to the several figures, the filler neck comprises a nipple 1 having a longitudinal bore 2 extending therethrough and opening in the outer face 3 of the filler neck. Said outer face is planiform and machined so as to have a smooth surface. A cross pin 4 extends diametrically through the filler neck, intersecting the longitudinal bore and forming with the outer portion of the filler neck a chamber 5 which loosely retains a ball check valve 6. The longitudinal bore 2 is provided near its outer end with a tapered shoulder 7' against which the ball seats, and by means of which it is retained in the chamber 5. The cross pin 4 extends at both ends beyond the filler neck to form the purchase for the bayonet slot connection of the coupling of a grease gun. In general, a filler neck having a cross pin with extending ends and a ball check valve imprisoned between the pin and the outer end of the filler neck bore is old in the art, the present invention relating to an improved form of pin and in the combination of this new pin with the filler neck structure.

Heretofore the cross pin has been a smooth cylindrical member pressed into the transverse pin bore. As a matter of fact, in pressing such a pin into the bore it is impossible to keep the pin in a precise rectilinear path, even though the two ends of the bore are precisely located with respect to the plane of the outer end of the filler neck. This is because the metal of the filler neck actually flows under the inserting pressure and metal is not perfectly homogeneous in its density, so that the pin will be diverted from a side of the bore where the metal is more dense, to a side where it is less dense. This diversion may be only microscopic in extent, but it is frequently sufficient to prevent the coupling of the grease gun from seating perfectly on the outer end of the filler neck when the bayonet slots of the coupling are tightened with respect to the cross pin.

For the same reason, that metal flows when under pressure, the holes forming the ends of the bore in which the pin is seated are dragged into an oval shape by the repeated tightening action of the bayonet slots so that microscopic play develops between the pin and the bore in the longitudinal direction of the filler neck, which play induces wear of the pin, and finally the pin becomes loose and works out.

It is also a fact that when a smooth pin is pressed into the bore it actually seats only on an indeterminate number of high spots, so that it is not very difficult for rotary or torsional movement between the pin and the filler neck to be set up by the frictional movement of the bayonet slot against the under side of the pin in the tightening operation. This torsional movement also produces wear and eventual looseness.

In the present invention, the pin 4 when first made is smooth and cylindrical. It is then placed in a die and has the zones 7 and 8 of knurls pressed into it. The pressing of the knurls causes a displacement of the metal in the knurled zones, so that the peaks of the knurls rise slightly above the general smooth cylindrical surface of the pin. The knurled zones, therefore, are of slightly greater diameter than the diameter of the smooth portion of the pin. The pin, including the knurls, is then hardened. It will be noted from Figures 2 to 5, inclusive, that the knurled zones 7 and 8 are narrower than the thickness of the wall of the filler neck, and that the knurled zones are preferably spaced apart a distance equal to the diameter of the longitudinal bore 2, so that that part of the pin which intersects said bore is smooth and opposes the minimum of friction resistance to the passage of the grease through said bore.

The pin 4, even the smooth portion, is of very slightly greater diameter than the diameter of the cylindrical bore in which the pin is inserted. The pin is pressed, with great pressure, endwise into the bore. The peaks of the knurls during the passage of the pin into the bore condense and displace the metal which they engage, forming grooves 8' with which the knurls interdigitate in the manner clearly shown in Figure 6. The pin 4 is pressed into place until the knurled zones are substantially flush with the opposite sides of the bore 2. It will be assumed that the pin is inserted in the direction of the arrow $a$ in Figure 4. When in this position, it will be readily understood that the metal of the filler neck surrounding the smooth portion 10 of the pin which lies within the left hand end of the pin bore in Figure 2 has not been penetrated by the knurls, and therefore, presents a solid wall against the ends of the knurls in the knurled zone 8, so that the pin cannot possibly escape by movement in a leftward direction. The metal of the wall of the filler neck which surrounds the smooth portion 11 of the pin adjacent the right hand side of the knurled zone 7, has of course, been grooved by the knurls of both zones during the incursion of the pin into the bore hole. These grooves are filled by swedging the metal of the wall of the filler neck firmly against the smooth portion 11 of the pin. In this manner the pin is firmly anchored against displacement in either direction by solid masses of metal abutting the outer edges of the knurled zones 7 and 8.

The interdigitation of the knurled zones with the surrounding walls of the pin bore, also greatly increases the surface of contact between the pin and the walls of the bore, thus further resisting any loosening of the pin during the strains incident to use, and the interdigitation of said knurls with the surrounding metal, also inhibits the possibility of any torsional or rotary movement of the pin in the pin bore.

In view of the fact that the knurls are parallel to the axis of the pin, and therefore, parallel to each other, they displace or cut parallel tracks in the walls of the pin bore, assuring that the pin will travel in a path precisely parallel to the axis of the pin bore, and not be diverted by the nonuniform flow of metal of the walls of the pin bore under the pressure of the inserting force.

After the correct insertion of the pin has been accomplished, the lower sides of both of the extending ends of the pin are ground off to form planiform bearing surfaces 12 and 13 which are about an eighth of an inch wide, and which lie precisely in a common plane parallel to the surface of the outer end 3 of the filler neck.

The width of these bearing surfaces assure that they will show minimum wear after long use, and their precise equidistance from the plane of the outer end 3 of the filler neck assures that the grease gun coupling will form a perfect joint throughout the entire extent of the outer end of the filler neck, thus preventing leakage at this joint, and conserving the pressure which is essential to force the grease to the ultimate points to which the lubricant is to be delivered.

While we have in the above description disclosed what we believe to be a preferred and practical embodiment of the invention, it will be understood to those skilled in the art that the specific details of construtcion and arrangement of parts are subject to some latitude of variation without transcending the spirit and scope of the appended claim.

What we claim as our invention is:

Filler neck comprising an integral metal nipple having a longitudinal bore opening through the outer end of said nipple, said outer end being planiform, said nipple being formed with aligned diametrical pin bores in opposite walls thereof intersecting said longitudinal bore and having their axes parallel to the plane of the outer end, and a cylindrical pin extending through said pin bores and outwardly therefrom beyond the sides of said nipple, said pin having a smooth intermediate portion, smooth end portions and knurled zones disposed between said smooth portions and of slightly larger diameter than said smooth portions, said knurled zones being narrower than the thickness of the nipple walls, having their inner ends substantially flush with the surface of the longitudinal bore and their outer ends terminating within said walls, said pin, both as to the smooth portions and knurled zones which lie within said walls being pressure-seated whereby the adjacent metal of the nipple is in condensed condition, the intact condensed metal which lies in endwise relation outwardly of one knurled zone forming a stop to prevent endwise movement of the pin in one direction, the condensed metal adjacent the outer end of the other knurled zone being upset into endwise relation to said last named knurled zone to prevent endwise movement of the pin in the other direction.

ERNEST B. NORMAN.
GEORGE A. PETTIT.
LEO F. SERRICK.